(12) United States Patent
Smith

(10) Patent No.: US 6,715,099 B1
(45) Date of Patent: Mar. 30, 2004

(54) HIGH-AVAILABILITY ARCHITECTURE USING HIGH-SPEED PIPES

(75) Inventor: Leslie Smith, Plesanton, CA (US)

(73) Assignee: Nortel Networks Limited, St. Laurent (CA)

( * ) Notice: Subject to any disclaimer, the term of this patent is extended or adjusted under 35 U.S.C. 154(b) by 562 days.

(21) Appl. No.: 09/585,577

(22) Filed: Jun. 2, 2000

Related U.S. Application Data

(60) Provisional application No. 60/137,203, filed on Jun. 2, 1999.

(51) Int. Cl.$^7$ .................................................. G06F 11/00
(52) U.S. Cl. .......................................... 714/4; 714/13
(58) Field of Search ...................... 714/11, 4, 12, 714/13; 709/216, 212

(56) References Cited

U.S. PATENT DOCUMENTS

| | | | | | |
|---|---|---|---|---|---|
| 5,951,695 | A | * | 9/1999 | Kolovson | 714/16 |
| 5,974,114 | A | * | 10/1999 | Blum et al. | 379/9 |
| 6,115,829 | A | * | 9/2000 | Slegel et al. | 714/10 |
| 6,205,557 | B1 | * | 3/2001 | Chong et al. | 714/4 |
| 6,263,363 | B1 | * | 7/2001 | Rosenblatt et al. | 709/217 |
| 6,298,457 | B1 | * | 10/2001 | Rachlin et al. | 714/49 |
| 6,363,497 | B1 | * | 3/2002 | Chrabaszcz | 714/13 |
| 6,378,021 | B1 | * | 4/2002 | Okazawa et al. | 710/317 |

* cited by examiner

*Primary Examiner*—Scott Baderman
*Assistant Examiner*—Joshua Lohn
(74) *Attorney, Agent, or Firm*—Kevin L. Smith

(57) ABSTRACT

Apparatus, system, and methods for a high availability computer system architecture using high-speed pipes are provided. An active computer system and a standby computer system are connected using a physical pipe for transferring data between the active computer system and the standby computer system. A first logical pipe is used for transferring data over the physical pipe, and a second logical pipe is used for transferring high-availability data over the physical pipe. Network-interface cards may be used to implement the high-speed pipes.

9 Claims, 4 Drawing Sheets

HIGH-AVAILABILITY ARCHITECTURE USING HIGH-SPEED PIPES

I. CROSS REFERENCE TO RELATED APPLICATIONS

This application claims the benefit of provisional application "Methods and Apparatus for High-Availability Architecture Using High-Speed Pipes," filed Jun. 2, 1999 bearing Serial No. 60/137,203, the contents of which are relied upon and incorporated by reference.

II. BACKGROUND OF THE INVENTION

A. Field of the Invention

The present invention relates generally to high availability computer system architectures, and in particular to apparatus, systems, and methods for a high-availability computer system architecture using high-speed pipes.

B. Description of the Related Art

Conventional high-availability computer systems use special purpose, dedicated systems for implementing redundancy. For example, some conventional systems utilize two computer systems, one of which is active and the other standby, and special purpose hardware and software that interacts with each computer system to implement high-availability. The special purpose hardware and software communicates with the active computer system to capture status information so that in the event the active system goes down the standby system can start in place of the active system using the information collected by the special purpose hardware and software.

Thus, conventional high-availability computer system architectures require special purpose hardware and software, which raises system costs. The additional costs make these systems very expensive. There is, therefore, a need for a high-availability computer system architecture that solves the problems associated with special purpose hardware and software high-availability systems.

III. SUMMARY OF THE INVENTION

Apparatus, systems, and methods consistent with the present invention utilize available high-speed pipes to transfer information necessary for high-availability between two computer systems. In one embodiment, one or more logical pipes are implemented on a physical pipe between two computer systems. The use of the term pipe refers to a communication channel. A physical pipe refers to a physical communication channel. A logical pipe refers to a logical communication channel, and high-availability information refers to data transferred between systems for purposes of implementing a high-availability architecture. The logical pipes are used for data transfer between an active system and a standby system so that the standby system has the information necessary to take over from the active system if the active system fails in some way. In one embodiment, the logical pipes that transfer information necessary for implementing high-availability are part of a physical pipe that also carries other types of information used by the active system.

The system may also use network interface cards to implement the high-speed pipes. The network interface cards (NIC) may be implemented using conventional interface cards without departing from the principles of the invention. For example, a NIC using Virtual Interface (VI) Architecture may be used.

By using logical pipes on existing physical pipes, there are significant cost savings as compared to conventional systems that require dedicated pipes to transfer the high-availability information. Moreover, by using network interface cards, additional cost savings may be realized. Logical pipes and network interface cards may also be used in combination. Because the architecture reduces or eliminates special purpose hardware and software, costs are significantly reduced.

An apparatus consistent with the present invention comprises a physical pipe for transferring data between an active system and a standby system. The apparatus further comprises a first logical pipe for transferring data over the physical pipe, and a second logical pipe for transferring high-availability data over the physical pipe.

Another apparatus consistent with the present invention comprises a physical pipe for transferring data between an active system and a standby system. The apparatus further comprises network interface card for transferring data and high-availability information over the physical pipe.

Yet another apparatus consistent with the present invention includes a physical pipe for transferring data between an active system and a standby system. The apparatus further comprises a first logical pipe for transferring checkpointing data over the physical pipe, and a second logical pipe for transferring total system state data over the physical pipe.

A system consistent with the present invention comprises a physical pipe. The system further comprises an active system for transferring data and high-availability information over the physical pipe, and a standby system for receiving the high-availability information from the physical pipe.

A method in a high-availability system having an active system and a standby system is provided. According to this method, the active system sends a message to the standby system to enter a switch-over state. The standby system monitors a transfer complete marker. The method transfers total system state from the active system to the standby system. The method switches the high-availability system from the active system to the standby system upon detecting the transfer complete marker.

Such apparatus, systems, and methods overcome the problems of conventional high-availability architectures described above. Additional advantages of the invention are apparent from the description which follows, and may be learned by practice of the invention. It is to be understood that both the foregoing general description and the following detailed description are exemplary and explanatory only and are not restrictive of the invention, as claimed.

IV. BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings, FIG. 1 is a block diagram showing a high-availability computer system consistent with the present invention;

V. DETAILED DESCRIPTION

Apparatus, systems, and methods consistent with the improved high-availability architecture disclosed herein use high-speed pipes to exchange information between an active computer system and a standby system. Appendix A, which contains a glossary of the terms and conventions used in describing the invention, is incorporated herein in its entirety as part of this Detailed Description.

HSP System Overview

High Speed Pipes system uses high speed pipes to transfer information necessary for high-availability between two computer systems. This information exchange permits a standby computer system to takeover in case the active system fails. The present system uses logical pipes on existing physical pipes, thereby realizing significant cost savings compared with conventional systems that require dedicated pipes for transferring high-availability information between computer systems.

Due to legacy reasons, the call processing platform redundancy scheme is based on a 1+1 model and can be expanded to work in an n+1 redundancy model.

The use of the term database in this document means protected memory region, hard disk drive files and any data structures common on both the active and standby system. The use of the term pipe refers to a communication channel. A physical pipe refers to a physical communication channel. A logical pipe refers to a logical communication channel, and high-availability information refers to data transferred between systems for purposes of implementing a high-availability architecture.

Interface A

Figure 1:
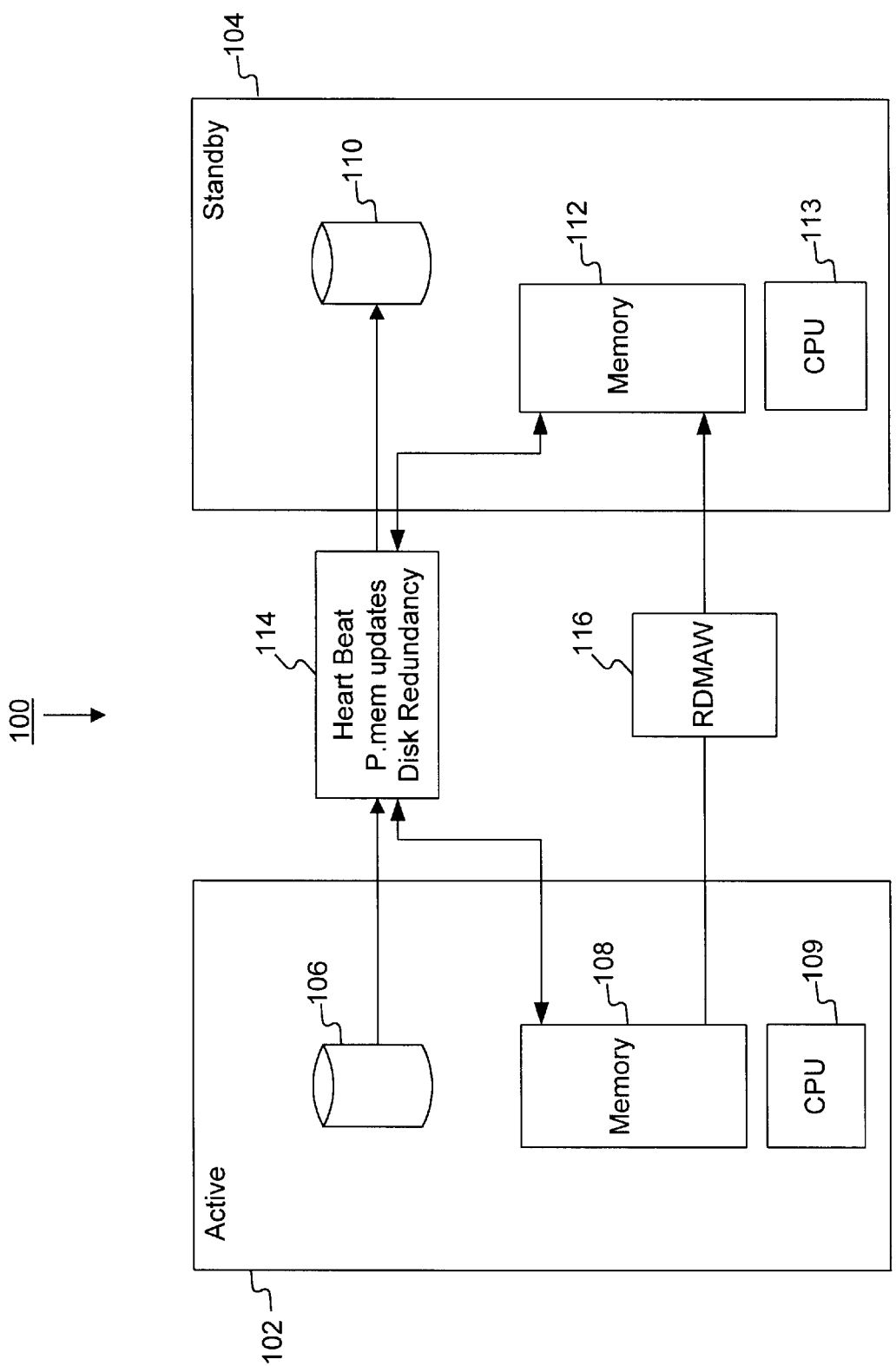

FIG. 1 illustrates a high-availability computer system 100. As shown in FIG. 1, active system 102 is interconnected with standby system 104. Active system 102 comprises a disk drive 106, memory 108, and CPU 109. Standby system 104 comprises a disk drive 110, memory 112, and CPU 113. Active system 102 and standby system 104 are interconnected via two interfaces or logical pipes: Interface A 114 and Interface B 116. Interface A 114 transfers two types of traffic:

Operational and Management (OA&M) and Health status

Transactions that change the state of the protected memory interface.

Accordingly, as shown in FIG. 1, Interface A 114, one of the logical pipes, is used to transfer "Heart Beat," or in other words messages between active node 102 and standby node 104 that make one system aware of another's existence or health. In addition, Interface A 114 is used to transfer "P.mem updates," or in other words any protected memory updates that occur on the active node are replicated on the standby node. Also, as shown in FIG. 1, Interface A 114 is used to ensure disk redundancy. For example, any updates or write operations performed on active node disk 106 are replicated on standby node disk 110. One skilled in the art will appreciate that other operational and management and health status information may also be transferred using Interface A. For example, any configuration changes made on active node 102 are replicated on standby node 104 by transferring commands or inputs associated with any configuration changes to the standby node using Interface A.

The characteristics of this interface are:

Low latency

Low CPU utilization

Moderate to high bandwidth

Low latency reduces the time window where a transaction has been placed into the logical pipe and the possibility of the active system failing during the transfer of the data, thus causing an inconsistency in the database on the standby side.

Low CPU utilization is required due to the large number of transactions expected between the two systems during normal operation. The utilization of the main CPU by processes or tasks other than for maintaining high-availability should not be greater than 10% during normal operation.

In many systems, the average traffic rate across this pipe will be relatively low, although during some administrative operations the traffic rate will have some significant bursts of traffic. In one embodiment, the pipe is configured to work within a client server type configuration, allowing software to access the pipe in a similar manner to a socket-based TCP/IP connection. All data sent across this pipe will be encapsulated and sent across as a message. Only complete transactions should be sent across this interface at any one time to prevent the case where a partial transaction has been sent to the standby side when active node failure occurs, thus causing an inconsistent database on the standby side. Alternatively, the transaction could be built on the inactive side from partial transactions, and then applied as a single transaction once it has been fully built. Due to the symmetrical nature of the system, it can be assumed that if a transaction is completed on the active side, the same transaction will be complete on the standby side, therefore no rollback and retry functionality will be required for the first phase of this system.

Failure of this link will cause inconsistency in the two databases. Therefore a procedure may be used to synchronize the databases without impact to the operation of the system. This synchronization could happen at any time. For example, synchronization could happen at hardware failure, software error, or human error (e.g., inadvertently removes cable).

To ensure database consistency, some form of audit facility may be run periodically. It will be assumed that the active database is correct and any differences will be applied to the standby database in the case of inconsistency.

Interface B

The second logical pipe, Interface B 116, between the two systems is used only during a Graceful Switch over (GSO). GSO in this context refers to the ability to transfer control from one processing element to a standby element within a brief period, such as one second, without any impact to the functionality of the system. To facilitate GSO, a data transfer mechanism transfers the total system state at a particular time by the active node to the standby node in the least amount of time possible, allowing the standby node to continue where the previously active node stopped.

Within the CPP system this transfer of data period is known as the stop and copy point. The requirements of the HSP during the stop and copy phase are considerably different to the requirements during normal operation.

During the stop and copy phase the HSP must exhibit the following characteristics:

Very High bandwidth.

OS-independent data transfer.

Does not change the system state on the active or inactive side.

The receiving side must pend and be notified of completion without OS involvement.

These requirements pose a number of technical challenges. Although many technologies offer very high bandwidth (IEEE 1394, Giga-bit Ethernet, etc.), many of them require the use of OS services. The use of a Direct Memory Access (DMA) engine fulfills most of the requirements except the ability to transfer the data between two independent nodes. Remote Direct Memory Access (RDMA) has all the same characteristics of regular DMA engines except that a DMA transaction can be performed across a pair of nodes, thus allowing a block of data to be directly transferred between the memory subsystems of two independent nodes. Two nodes of RDMA exist: Remote Direct Memory Access Write (RDMAW) and Remote Direct Memory Access Read (RDMAR). The two may be viewed as push (the initiator writes directly into the recipients memory) for RDMAW and pull (the initiator reads the hosts memory and copies the data into its own memory) for RDMAR. All current adaptors support RDMAW, a few also support RDMAR. Even though FIG. 1 depicts RDMAW operation, one skilled in the art will appreciate that RDMAR may also be used.

Figure 2:
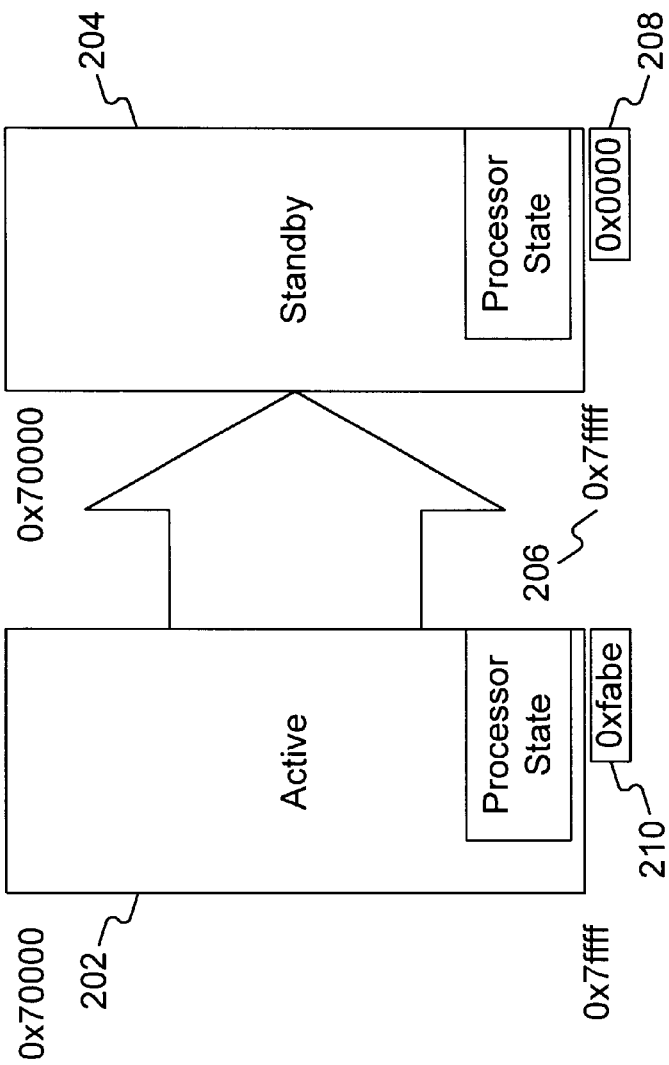
FIG. 2 is a block diagram showing a method using a transfer complete marker consistent with the present invention.

The receiving side must know when the transfer is complete. In one embodiment, a small loop is entered on the receiving side where a memory address is monitored. When this location changes, the last byte of the transfer has completed, allowing the standby side to return out of the GSO and assume the role of the active node. For example, as shown in FIG. 2, address location 0x7ffff 206 on standby node 204 is set to 0x0000 initially and is monitored. When this location changes to a previously agreed upon value, the transfer complete marker, it indicates that transfer has been completed and thus standby side may assume the role of the active node. In FIG. 2, for example, a value of 0xfabe 210 is depicted as the transfer complete marker. One skilled in the art will appreciate that this value could be any non-zero value that the active node and the standby node have agreed to treat as the transfer complete marker.

Figure 3:
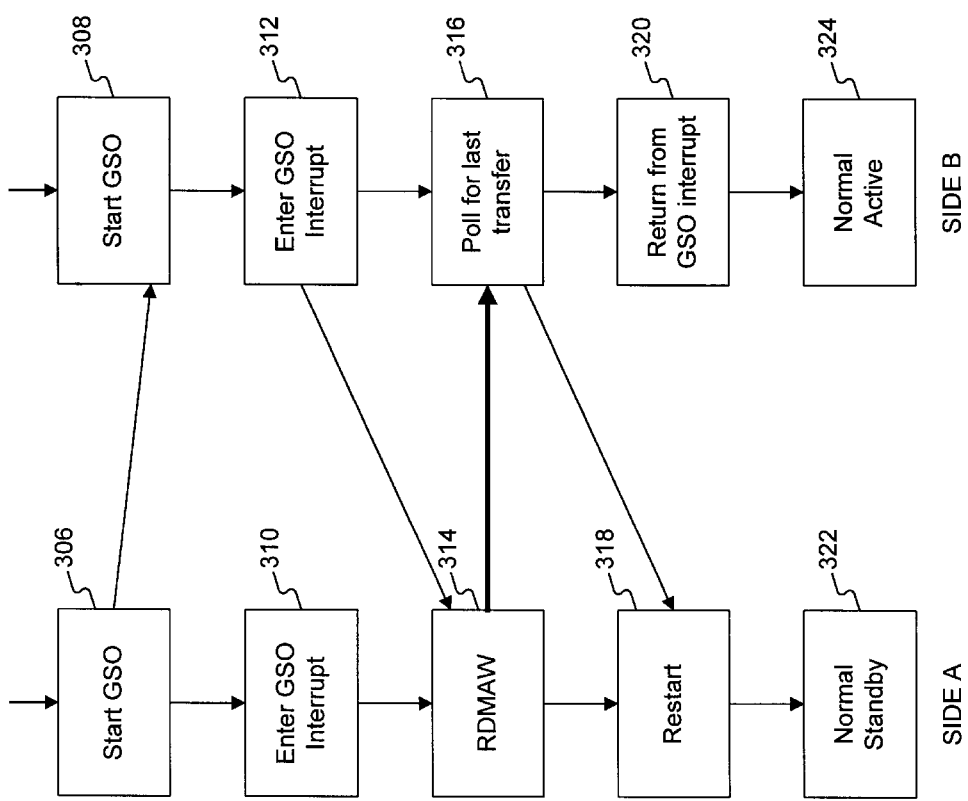
FIG. 3 is a block diagram showing transitions for Graceful Switch Over consistent with the present invention.

FIG. 3 is a block diagram illustrating an overview of the transitions taking place on both nodes during a GSO. Initially, Side A, the active side is in normal active 302 state. Side B, the standby side, is in normal standby 304 state. In one embodiment a GSO event is always initiated by the active side 'A' by sending a message to the standby side 'B' to enter the GSO receive state. Thus, side A enters Start GSO 306 state and upon receiving the Start GSO message, side B enters Start GSO 308 state as well. Side 'A' then enters a PRE-GSO state, the GSO Interrupt State (State 310), and waits for an acknowledgment from side 'B' that it is ready to receive the system image. Side 'B' stops all activity and enters a small loop looking for a specific memory location to change, the GSO Interrupt State (state 312). Side 'A' then initiates the RDMAW, and enters a loop, similar to side 'B,' to prevent it from restarting until the system image has been transferred (state 314). Side 'B' sends a done message to side 'A' when it detects that the transfer complete marker has changed (state 316), thus allowing the side 'A' to restart (state 318) and become the standby node (state 322). Side 'B' then executes a return from interrupt or return from exception instruction, for example, IRET (state 320), causing the processor to continue from the point where side 'A' jumped into the GSO interrupt, thus assuming the role of the active node (state 324). One skilled in the art will appreciate that even though FIG. 3 depicts the state transitions in a particular order, the order of these state transitions may be changed.

Use of a Network Interface Card (NIC) as HSP

A commercially available NIC from Compaq (Servernet), that fulfills the requirements of the HSP may be used to implement the physical and the logical pipes. Recently the Servernet card has been externalized for the open systems server market, allowing it to be used as the HSP hardware. Some NIC's include a virtual interface architecture, such as the Virtual Interface Architecture (VIA) standard.

Conventional NIC's, such as the Servernet card, employ a dual interconnect fabric denoted X and Y allowing transparent link redundancy to be part of the standard interface. In one embodiment of the invention, the NIC has native VIA processing in the hardware. In another embodiment, a software VIA emulator may be used, allowing software to be written to utilize the VIA interface.

An important feature of all VIA NIC's is that they have to provide the ability to do RDMAW operations because the RDMAW is the basic transport mechanism of the VIA interface. One consideration for CPP high availability strategy is that the RDMAW can take place with no OS support, because of the requirement that both the active and standby sides are in a locked interrupt state to prevent the OS state from changing.

Software Interface

The following is an overview of the software interface for the two logical HSP's. It should be noted that VIA is a channel architecture. Therefore, one or more logical pipes may exist through one physical pipe.

Send/Receive

Figure 4:
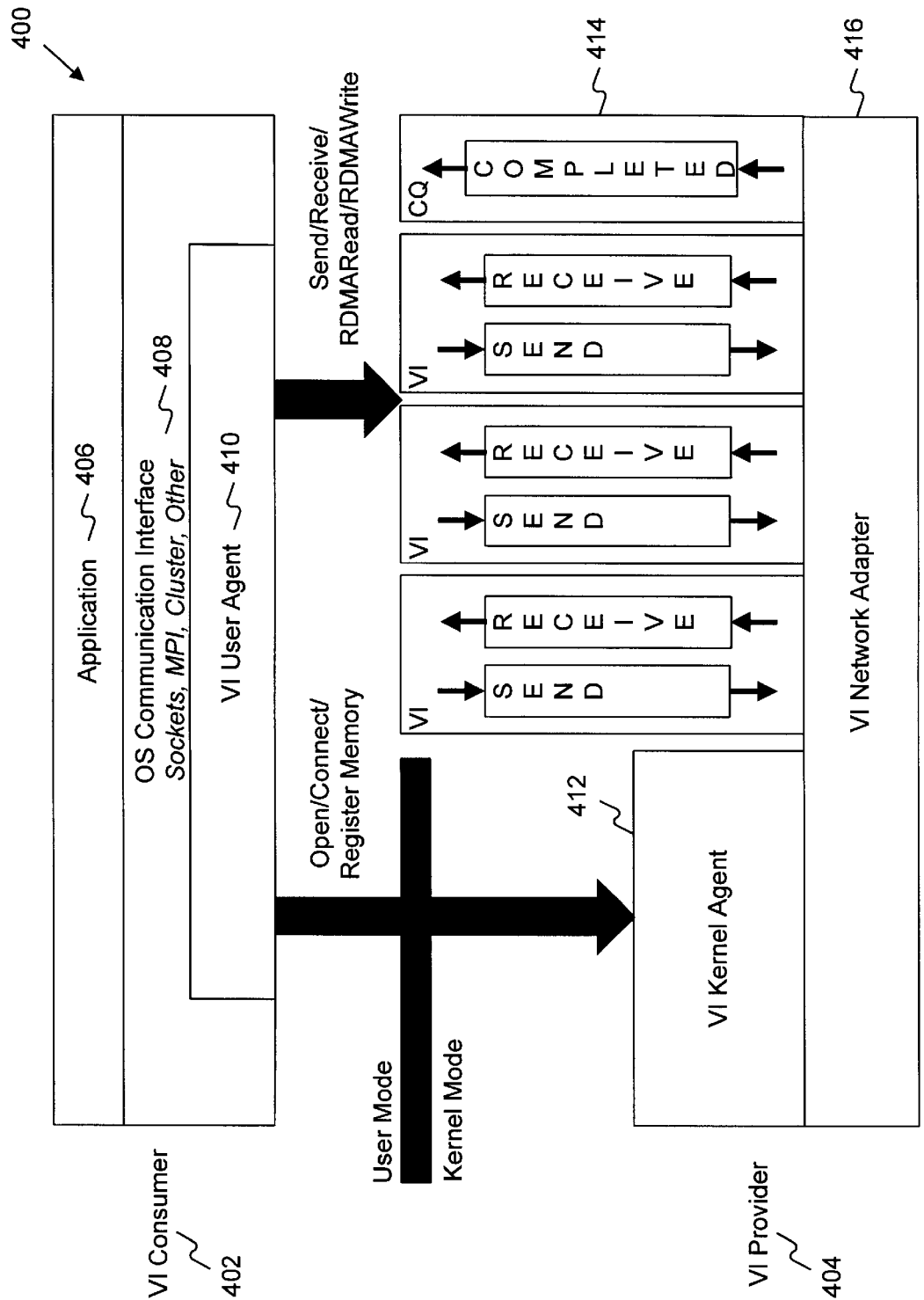
FIG. 4 is a block diagram illustrating the VI Architectural Model consistent with the present invention.

The Send/Receive model of the known VI Architecture follows a well-known model of transferring data between two endpoints. As shown in FIG. 4, VI Architectural Model 400 depicts the relationship between VI Consumer 402 and VI Provider 404. VI Consumer 402 comprises Application 406, OS Communication Interface 408, and VI User Agent 410. OS Communication Interface may consist of sockets, Message Passing Interface (MPI), Cluster, or other communication mechanisms. VI Provider 404 comprises VI Kernel Agent 412, VI Send/Receive and Completion Module 414, and VI Network Adapter 416.

In one implementation VI Consumer 402 runs in the user mode and VI Provider 404 runs in the kernel mode as depicted in FIG. 4.

In this model, the VI Consumer on the local node always specifies the location of the data. On the sending side, the sending process specifies the memory regions that contain the data to be sent. On the receiving side, the receiving process specifies the memory regions where the data will be placed. Given a single connection, there is a one-to-one correspondence between send Descriptors on the transmitting side and receive Descriptors on the receiving side.

The VI Consumer at the receiving end pre-posts a Descriptor to the receive queue of a VI send/receive module. The VI Consumer at the sending end can then post the message to the corresponding VI's send queue. The Send/Receive model of data transfer requires that the VI Consumers be notified of Descriptor completion at both ends of the transfer, for synchronization purposes. VI Consumers are responsible for managing flow control on a connection. The VI Consumer on the receiving side must post a Receive Descriptor of sufficient size before the sender's data arrives. If the Receive Descriptor at the head of the queue is not large enough to handle the incoming message, or the Receive Queue is empty, an error will occur. The connection may be broken if it is intended to be reliable. The VI Architecture differs from some existing models in that all Send/Receive operations are completed asynchronously.

Remote Direct Memory Access (RDMA)

In the RDMA Model, the initiator of the data transfer specifies both the source buffer and the destination buffer of the data transfer. There are two types of RDMA operations, RDMA Write and RDMA Read.

For the RDMA Write operation, the VI Consumer specifies the source of the data transfer in one of its local registered memory regions, and the destination of the data transfer within a remote memory region that has been registered on the remote system. The source of an RDMA Write can be specified as a gather list of buffers, while the destination must be a single, virtually contiguous region.

The RDMA Write operation implies that prior to the data transfer, the VI Consumer at the remote end has informed the initiator of the RDMA Write of the location of the destination buffer, and that the buffer itself is enabled for RDMA Write operations. The remote location of the data is specified by its virtual address and its associated memory handle. For the RDMA Read operation, the VI Consumer specifies the source of the data transfer at the remote end, and the destination of the data transfer within a locally registered memory region. The VI Consumer on the receiving side must post a Receive Descriptor to receive the Immediate Data, before the sender executes the RDMA Write. If no Descriptor is posted, an error will occur and the connection may be broken.

The following using Servernet as an example, is a list of actions and VI Architecture calls required to support both HSP links required for the CPP high availability pipes.

Hardware Init
    ServernetInit
    ServernerReset
    Hardware Connection
    VipOpenNic
    VipCloseNic
    Endpoint Creation and Destruction
    VipCreateVi
    VipDestroyVi
    Connection Management
    VipConnectWait
    VipConnectAccept
    VipConnectRequest
    VipDisconnect
    Data Transfer
    VipPostSend
    VipSendDone
    VipSendWait
    VipPostRecv
    VipRecvDone
    VipRecvWait
    Querying Information
    VlpQueryNic
    VipSetViAttributes
    VipQueryVi
    VipQuerySystemManagementlnfo Special requirements for stop and copy functionality.

RDMAW does not change OS state during operation, on both initiator and receiver.

During a RDMAW operation memory transfer may be implemented in a variety of ways. For example, the system could start at lower memory location and increment address as data is transferred, or start at high memory location and decrement address as data is transferred.

Apparatus, systems, and methods consistent with the principles of the invention disclosed herein provide a high-availability architecture using high-speed pipes. The high-speed pipes may be implemented using logical pipes over an existing physical pipe. The high-speed pipes may also be implemented using conventional network interface cards.

VI. CONCLUSION

It will be apparent to those skilled in the art that various modifications and variations can be made in the high-availability apparatus, system, and methods consistent with the principles of the present invention without departing from the scope or spirit of the invention. Although several embodiments have been described above, other variations are possible within the spirit and scope consistent with the principles of the present invention.

Although the invention has been described in terms of two systems, the principles may be applied to more than two systems. The principles of the invention, as disclosed herein, may be used in any environment requiring high-availability. For example, the principles may be used in financial settings or call-processing systems.

The apparatus disclosed herein should be understood to support the processes performed thereby, and, similarly, the processes disclosed herein should be understood to support the apparatus necessary to perform the steps of the processes. It should be further understood that the apparatus and methods disclosed herein may be implemented entirely in hardware, entirely in software, or a mixture of hardware and software.

The apparatus and method consistent with the present invention and disclosed herein are related to apparatus and methods for a high-availability architecture using high-speed pipes. Parts of the architecture may be implemented in whole or in part by one or more sequences of instructions which carry out the apparatus and method described herein. Such instructions may be read by the computer systems or by network interface cards from a computer-readable medium, such as a storage device. Execution of sequences of instructions by the computer system or network interface cards causes performance of process steps consistent with the present invention described herein. Execution of sequences of instructions may also be considered to implement apparatus elements that perform the process steps. Hard-wired circuitry may be used in place of or in combination with software instructions to implement the invention. Thus, embodiments of the invention are not limited to any specific combination of hardware circuitry and software.

The term "computer-readable medium" as used herein refers to any medium that may store instructions for execution. Such a medium may take many forms, including but not limited to, non-volatile memory media, volatile memory media, and transmission media. Non-volatile memory media includes, for example, optical or magnetic disks. Volatile memory media includes RAM. Transmission media includes, for example, coaxial cables, copper wire and fiber optics, including the wires. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic storage medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of computer readable media may be involved in carrying one or more sequences of instructions for execution to implement the high-availability architecture described herein. For example, the instructions may initially be carried on a magnetic disk or a remote computer. The remote computer can load the instructions into its dynamic memory and send the instructions over a telephone line using a modem. A modem local to a computer system can receive the data on the telephone line and use an infra-red transmitter to convert the data to an infra-red signal. An infra-red detector coupled to appropriate circuitry can receive the data carried in the infra-red signal and place the data on a bus. The bus may carry data to a memory, from which a processor retrieves and executes the instructions. The instructions received by the memory may optionally be stored on a storage device either before or after execution by the processor.

Other embodiments of the invention will be apparent to those skilled in the art from consideration of the specification and practice of the disclosed embodiments. The specification and examples are exemplary only, and the true scope and spirit of the invention is defined by the following claims and their equivalents.

I claim:

1. An apparatus for implementing a high-availability computer system architecture, comprising:

a physical pipe for transferring data between an active computer system and a standby computer system;

a first logical pipe for transferring data over the physical pipe; and a second logical pipe for transferring high-availability data over the physical pipe, and wherein the second logical pipe uses remote direct memory access write operations for transferring high-availability data.

2. An apparatus for implementing a high-availability computer system architecture, comprising:

a physical pipe for transferring data between an active computer system and a standby computer system;

a first logical pipe for transferring data over the physical pipe; and a second logical pipe for transferring high-availability data over the physical pipe and wherein the second logical pipe uses remote direct memory access read operations for transferring high-availability data.

3. An apparatus for implementing a high-availability computer system architecture, comprising:

a physical pipe for transferring data between an active computer system and a standby computer system; and a network interface card for transferring data and high-availability information over the physical pipe, and wherein the network interface card uses remote direct memory access write operations for transferring high-availability data.

4. An apparatus for implementing a high-availability computer system architecture, comprising:

a physical pipe for transferring data between an active computer system and a standby computer system; and a network interface card for transferring data and high-availability information over the physical pipe, and wherein the network interface card uses remote direct memory access write operations for transferring high-availability data.

5. A system for implementing a high-availability computer system architecture, comprising:

physical means for transferring data between an active computer system and a standby computer system;

a first logical means for transferring data over the physical means; and a second logical means for transferring high-availability data over the physical means, and wherein the second logical means uses a one of remote direct memory access read operations and remote direct memory access write operations for transferring high-availability data.

6. An apparatus for implementing a high-availability computer system architecture, comprising:

a physical pipe for transferring data between an active computer system and a standby computer system;

a first logical pipe for transferring checkpointing data over the physical pipe; and a second logical pipe for transferring total system state data over the physical pipe, and wherein the second logical pipe uses remote direct memory access write operations for transferring total system state data over the physical pipe.

7. An apparatus for implementing a high-availability computer system architecture, comprising:

a physical pipe for transferring data between an active computer system and a standby computer system;

a first logical pipe for transferring checkpointing data over the physical pipe; and a second logical pipe for transferring total system state data over the physical pipe, and wherein the second logical pipe uses remote direct memory access read operations for transferring total system state data over the physical pipe.

8. A method in a high-availability computer system having an active computer system and a standby computer system, the method comprising the steps of:

sending a message to the standby computer system to enter a switch-over state;

monitoring a transfer complete marker;

transferring total system state from the active computer system to the standby computer system, and wherein transferring total system state from the active computer system to the standby computer system further includes performing a one of remote direct memory access read operations and remote direct memory access write operations; and switching from the active computer system to the standby computer system upon detecting the transfer complete marker.

9. A computer-readable medium containing instructions for performing a method in a high-availability computer system having an active computer system and a standby computer system, the method comprising the steps of:

sending a message to the standby computer system to enter a switch-over state;

monitoring a transfer complete marker;

transferring total system state from the active computer system to the standby computer system, and wherein transferring total system state from the active computer system to the standby computer system further includes performing a one of remote direct memory access read operations and remote direct memory access write operations; and switching from the active computer system to the standby computer system upon detecting the transfer complete marker.

* * * * *